United States Patent Office 2,727,021
Patented Dec. 13, 1955

2,727,021

POLYMERIZABLE AND POLYMERIZED AMINO-ETHYL ACRYLATE-ACRYLONITRILE COMPOSITIONS

John A. Price, Stamford, Conn., assignor to American Cyanamid Company, New York, N. Y., a corporation of Maine No Drawing. Application October 30, 1951,
Serial No. 253,965

8 Claims. (Cl. 260—85.5)

This invention relates to new and useful compositions of matter, and more particularly is concerned with polymerizable and polymerized acrylonitrile compositions. Still more particularly the present invention is directed to polymerizable compositions comprising (1) a compound represented by the general formula I.
$$CH_2=CH-\overset{O}{\underset{\|}{C}}-O-CH_2-CH_2-N<R$$

where —N<R represents the residue of a heterocyclic tertiary amine, and (2) acrylonitrile, the compound of (1) constituting from about 1% to about 20% by weight of the total amount of (1) and (2). Illustrative examples of radicals represented by —N<R in the above formula are morpholinyl, thiamorpholinyl, piperidyl, pyrrolidyl, piperazyl, imidazolyl, pyrazolyl, pyrryl, pyrrolyl, etc. The formulas for these radicals (residues of heterocyclic tertiary amines) just given by way of illustration, and which —N<R in Formula I can represent, are as follows:

II. 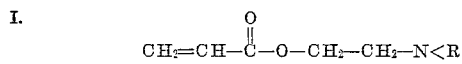
4-morpholinyl

III. 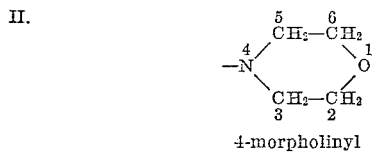
4-thiamorpholinyl

IV. 
1-piperidyl

V. 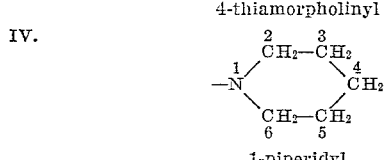
1-pyrrolidyl

VI. 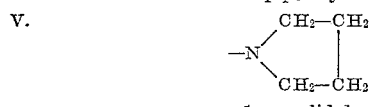
1-piperazyl

VII. 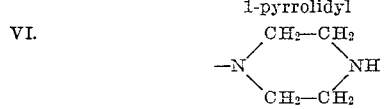
1-imidazolyl

VIII. 
1-pyrazolyl

IX. 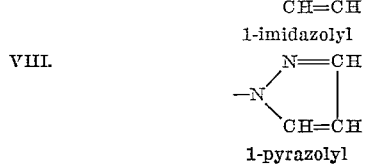
1-pyrryl

X. 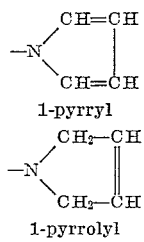
1-pyrrolyl

Additional examples of radicals represented by —N<R in Formula I are the C-alkyl (e. g., C-methyl to -octadecyl, inclusive), C-aralkyl (e. g., C-benzyl, C-phenylethyl, C-tolylethyl, C-phenylpropyl, etc.), C-cycloalkyl (e. g., C-cyclopentyl, C-cyclohexyl, etc.), C-aryl (e. g., C-phenyl, C-biphenylyl, etc.) and C-alkaryl (e. g., C-tolyl, C-xylyl, C-ethylphenyl, etc.) derivatives of the aforementioned heterocyclic tertiary-amino radicals given by way of illustration. Such C-substituents can be attached, instead of hydrogen, to any or all of the carbon atoms in the above formulas.

A specific example of a compound embraced by Formula I is 2-(4-morpholinyl)ethyl acrylate, the formula for which is XI. 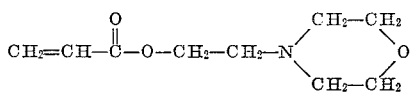

The scope of the invention also includes products comprising such polymerized compositions, e. g., a product (or a composition) comprising a copolymer of copolymerizable substances including 2-(4-morpholinyl)ethyl acrylate and acrylonitrile in a weight ratio of from about 1% to about 20% of the former to from about 99% to about 80% of the latter, including a copolymer of mixed monomers consisting of from 2% to 10% or 15% of a compound of 2-(4-morpholinyl)ethyl acrylate and the remainder acrylonitrile; and, also, methods of preparing such compositions or products. The claims of this application are directed specifically to compositions, products and method of the kind described above wherein 2-(4-morpholinyl)ethyl acrylate is the compound embraced by Formula I that is employed.

Some of the heterocyclic tertiary-aminoethyl acrylates embraced by Formula I are commercially available. In general, such compounds can be prepared by reacting a lower aliphatic alcohol ester of acrylic acid with a 2-hydroxyethyl alcohol of the heterocyclic tertiary amine. The procedure being essentially the same as that described in, for instance, Patent No. 2,138,763 with reference to the preparation of amino alcohol esters of an α-alkacrylic acid.

The present invention has, as one of its main objects, the production of new acrylonitrile copolymer compositions which are more readily dyed, especially with acid dyes, than homopolymeric acrylonitrile or many of the copolymers of acrylonitrile and another monomer or monomers that were known or suggested prior to my invention.

Another object of the invention is to prepare such copolymers which can be spun or otherwise shaped to form filaments, tapes, ribbons, rods, tubes, sheets, etc., and the shaped articles then dyed either before or after having been oriented to improve their useful properties.

Other objects of the invention will be apparent to those skilled in the art from the description and examples which follow.

These objects are accomplished, in general, by preparing a copolymer of ingredients comprising acrylonitrile and a compound (or a plurality of compounds) of the kind embraced by Formula I, more particularly 2-(4-morpholinyl)ethyl acrylate. The copolymer advantageously is produced, for instance, by polymerizing in an aqueous medium, with the aid of a polymerization catalyst (or catalysts), a mixture of comonomers including (1) a compound of the kind covered by Formula I and (2) acrylonitrile, the compound of (1) constituting from about 1% to about 20% by weight of the total amount of (1) and (2); and, at the end of the polymerization period, isolating the resulting copolymer.

Any suitable means may be used in effecting copolymerization of acrylonitrile with the compound embraced by Formula I, specifically 2-(4-morpholinyl) ethyl acrylate. Heat, light, or both heat and light, with or without a polymerization catalyst can be used. A polymerization catalyst preferably is employed in order to shorten the period of time required for polymerization of the mixture of ingredients comprising acrylonitrile and the heterocyclic tertiary-aminoethyl acrylate. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic peracids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxides and other catalysts that can be employed are given in the aforementioned Drechsel and Padbury Patent No. 2,550,652.

The concentration of the catalyst employed is usually small, that is, for the preferred catalysts from, by weight, about 0.5 or 1 part of catalyst per thousand parts of the polymerizable composition to be polymerized to about 3 or 4 or more parts of catalyst per 100 parts of the mixture of comonomers. If an inhibitor of the kind hereinafter mentioned be present, larger amounts of catalyst may be necessary according to the concentration of the inhibitor.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C. more particularly within the range of 20° C. or 30° C. (ordinary room temperature) to 130° C., depending upon the particular mixture of monomers employed, the particular catalyst, if any, used, the rapidity of polymerization wanted, and other influencing factors. With certain catalysts, more particularly strong acidic polymerization catalysts such, for instance, as gaseous boron trifluoride-ethyl ether complex, concentrated sulfuric acid, anhydrous aluminum chloride, etc., a substantially lower polymerization temperature often advantageously may be used, e. g., temperatures ranging between −80° C. and 0° C. or 10° C. At the lower temperatures below the solidification point of the monomeric mixture (or components thereof), polymerization is effected while the mixture of monomers is dissolved or dispersed in a solvent or dispersion medium which is liquid at the temperature of polymerization. Or, if desired, the monomeric mixture, that is, the polymerizable composition, can be polymerized in dissolved or dispersed state at temperatures above its solidification point or above the solidification point of the polymerizable components thereof. The copolymer can be separated from the liquid medium in which copolymerization was effected by any suitable means, e. g., by filtration, centrifuging, solvent extraction, etc.

In some cases it may be desirable to incorporate into the polymerizable composition an inhibitor which is adapted to inhibit copolymerization of the individual monomers present in the composition. When it is desired to use the inhibitor-modified composition, a catalyst is added in an amount sufficient to promote the polymerization reaction and to yield a copolymer. Any suitable inhibitor can be used, e. g., tannin, phenol, resorcinol, hydroquinone, ascorbic acid, isoascorbic acid, phenyl-α-naphthylamine, N,N′-di-2-naphthyl-p-phenylenediamine, certain cupric salts, e. g., cupric acetate, etc. The amount of the polymerization inhibitor may be considerably varied, but ordinarily it is employed in an amount not exceeding 3%, generally less than 1%, by weight of the monomer or mixture of comonomers, e. g., from 0.01% to 0.5% or 0.6% by weight thereof.

In order that those skilled in the art may better understand how the present invention can be carried into effect, the following examples are given by way of illustration and not by way of limitation. All parts and percentages are by weight.

In some of the examples the heterocyclic tertiary-aminoethyl acrylate employed is 2-(4-morpholinyl)ethyl acrylate, which is specified in the claims of the instant application; while other examples involve the use of other aminoethyl acrylates embraced by Formula I in preparing copolymers thereof with acrylonitrile.

*Example 1*

This example illustrates the preparation of homopolymeric acrylonitrile, which is subsequently employed in comparative tests with certain of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Buchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

*Example 2*

To a reaction vessel equipped as in Example 1 is added a solution of 50.35 parts of acrylonitrile, 2.65 parts of 2-(4-morpholinyl)ethyl acrylate, 1000 parts of distilled water, and 0.82 part of sulfuric acid. The pH of this solution is 3.0. A rapid stream of pre-purified nitrogen gas is passed over the surface of the solution for 30 minutes. The nitrogen flow is then reduced to about one bubble per second. To the vessel is now added 1.71 parts of ammonium persulfate and 0.36 part of sodium bisulfite (meta), each dissolved in 50 parts of distilled water. The polymerization is carried out for 6 hours at 35° C. The copolymer is collected on a Buchner funnel, washed with 2000 parts of deionized water, and is dried in an oven at 70° C. for about 16 hours. The yield of dry, white copolymer of acrylonitrile and 2-(4-morpholinyl)ethyl acrylate amounts to 48.5 parts, a portion of which is used in the dye tests described in a later example.

*Example 3*

Exactly the same procedure is followed as described under Example 2 with the exception that instead of 2.65 parts of 2-(4-morpholinyl)ethyl acrylate there is used 2.65 parts of 2-(1-piperidyl)ethyl acrylate. A good yield of a solid copolymer of acrylonitrile and 2-(1-piperidyl)-ethyl acrylate is obtained. A portion of the dry copolymer is used in the dye tests described in a later example.

*Example 4*

Same as in Example 2 with the exception that there are used 47.7 parts instead of 50.35 parts of acrylonitrile, 5.3 parts of 2-(4-thiamorpholinyl)ethyl acrylate instead of 2.65 parts of 2-(4-morpholinyl)ethyl acrylate and 1.5 parts instead of 0.82 part of sulfuric acid; also, the time of polymerization is 8 hours at 60° C. instead of 6 hours at 35° C. A portion of the resulting solid copolymer of acrylonitrile and 2-(4-thiamorpholinyl)ethyl acrylate is employed in the dye tests described in a later example.

*Example 5*

In this example, too, exactly the same procedure is followed as described under Example 2 with the exception that there are used 51.94 parts instead of 50.35 parts of acrylonitrile, 1.06 parts of 2-(1-piperazyl)ethyl acrylate in place of 2.65 parts of 2-(4-morpholinyl)ethyl acrylate and 0.66 part instead of 0.82 part of sulfuric acid. A good yield of a solid copolymer of acrylonitrile and 2-(1-piperazyl)ethyl acrylate is obtained. A portion of the dry copolymer is employed in the dye tests described in a later example.

*Example 6*

Same as in Example 2 with the exception that there are used 45.05 parts instead of 50.35 parts of acrylonitrile, 7.95 parts of 2-(1-pyrrolidyl)ethyl acrylate in place of 2.65 parts of 2-(4-morpholinyl)ethyl acrylate, and 2.69 parts instead of 0.82 part of sulfuric acid; also, the time of polymerization is 12 hours at 60° C. instead of 6 hours at 35° C. A portion of the resulting solid copolymer of acrylonitrile and 2-(1-pyrrolidyl)ethyl acrylate is employed in the dye tests described in a later example.

*Example 7*

Same as in Example 2 with the exception that there are used 47.7 parts instead of 50.35 parts of acrylonitrile, 5.3 parts of 2-(1-imidazolyl)ethyl acrylate and 1.83 parts instead of 0.82 part of sulfuric acid; also, the time of polymerization is 8 hours instead of 6 hours. A portion of the resulting solid copolymer of acrylonitrile and 2-(1-imidazolyl)ethyl acrylate is employed in the dye tests described in a later example.

*Example 8*

In this example, too, exactly the same procedure is followed as described under Example 2 with the exception that there are used 2.65 parts of 2-(1-pyrazolyl)ethyl acrylate instead of 2.65 parts of 2-(4-morpholinyl)ethyl acrylate and 0.91 part instead of 0.82 part of sulfuric acid. A portion of the resulting solid copolymer of acrylonitrile and 2-(1-pyrazolyl)ethyl acrylate is employed in the dye tests described in a later example.

In the same manner described in the preceding paragraph, a copolymer of mixed monomers consisting of from about 1% to about 15 or 20% of a compound of the kind embraced by Formula I, e. g., 2-(4-morpholinyl)-ethyl acrylate, and from about 80% to about 99% of a different vinyl compound, specifically acrylonitrile, more particularly from about 2% to about 10% by weight of, for example, 2-(4-morpholinyl)ethyl acrylate and the remainder acrylonitrile, can be produced.

*Example 9*

A tripolymer of (1) acrylonitrile, (2) an alkyl ester of an acrylic acid, more particularly such an ester containing not more than 4 carbon atoms in the alkyl grouping, and specifically methyl acrylate, and (3) a compound of the kind embraced by Formula I, specifically 2-(4-morpholinyl)ethyl acrylate, is produced by following exactly the same procedure given under Example 2 with the exception that there are used 47.7 parts instead of 50.35 parts of acrylonitrile and 2.65 parts of methyl acrylate in addition to 2.65 parts of 2-(4-morpholinyl)ethyl acrylate; also, the time of polymerization is 8 hours instead of 6 hours. A portion of the resulting solid tripolymer of acrylonitrile, methyl acrylate and 2-(4-morpholinyl)ethyl acrylate is employed in the dye tests described in the following example.

*Example 10*

Samples of the homopolymeric acrylonitrile of Example 1 and of the copolymers of Examples 2 to 9, inclusive, are subjected to the following dye test:

A sample (5 parts) of the dry polymer or copolymer is added to a dye bath consisting of 500 parts of an aqueous solution containing 0.2 part of concentrated sulfuric acid, 1 part of sodium sulfate and 0.2 part of Calococid Alizarine Blue SAPG (Color Index No. 1054). The dye bath is boiled for 30 minutes, after which the polymerization product is filtered off and washed with hot water until the water is free of dye. The copolymers of Examples 2 to 9, inclusive, are dyed blue, the intensity being, in general, directly proportional to the percentage of basic nitrogen-containing monomer used in forming the copolymer; that is, copolymers containing the higher content of basic nitrogen-containing monomer yield, in general, the deeper dyeings. In marked contrast, the homopolymeric acrylonitrile of Example 1 fails to absorb any dye. The advantage of modifying an acrylonitrile polymerization product by replacing a part, more particularly from about 1.0% to about 15 or 20% or more, and specifically from 2% to 5 or 10% of the initial acrylonitrile, with a compound of the kind embraced by Formula I, thereby to obtain a copolymeric acrylonitrile substance of improved dyeability, is therefore quite apparent.

It will be understood, of course, by those skilled in the art that my invention is not limited to the specific ingredients named in the above illustrative examples nor to the particular proportions and method of copolymerization mentioned therein. Thus, instead of the reduction-oxidation (redox) catalyst system named in the different examples, any other polymerization catalyst or combination of polymerization catalysts, numerous examples of which have been given hereinbefore, can be used.

Likewise, other modifying comonomers, in addition to the methyl acrylate named in Example 9, can be used. Illustrative examples of such comonomers are vinyl compounds which are different from acrylonitrile (vinyl cyanide), including the vinyl aromatic compounds, more particularly the vinyl aromatic hydrocarbons (e. g., styrene, the various dialkyl styrenes, etc.), other aliphatic compounds containing a $CH_2=C<$ grouping, e. g., the various substituted acrylonitriles (e. g., methacrylonitrile, ethacrylonitrile, phenylacrylonitrile, etc.), acrylamide, and the various substituted acrylamides (e. g., methacrylamide, ethacrylamide, the various N-substituted acrylamides and the various N-substituted alkacrylamides, for instance N-methylol acrylamide, N-monoalkyl, and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid, more particularly the alkyl esters of acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic acid, including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of any modifying comonomer or comonomers that are incorporated in the polymerizable composition together with the acrylonitrile and the tertiary-aminoethyl acrylate can be varied as desired or as conditions may require. Ordinarily, however, the acrylonitrile constitutes a major or preponderant proportion (more than 50%) by weight of the total weight of monomers to be copolymerized, the tertiary-aminoethyl acrylate constitutes from about 1% to about 20% of the total weight of the acrylonitrile and tertiary-aminoethyl acrylate, and any modifying comonomer or comonomers (if present in the polymerizable mixture) constitute the remainder of the total amount of comonomers which are subjected to copolymerization.

In the preferred copolymer compositions (more particularly thermoplastic copolymer compositions) of the present invention, the acrylonitrile is employed in the mixture of comonomers in an amount such that at least 85% by weight of combined acrylontrile is present in the copolymer. When the polymerization rates of the acrylonitrile and additional monomer or monomers are different from each other, then it may be necessary to start with an amount of acrylonitrile either more or less than 85% by weight of the total mixture of monomers in order that the final copolymer will contain at least 85% by weight of combined acrylonitrile in the copolymer molecule. Similarly, in order that the finished copolymer shall contain, in the copolymer molecule, from about 1% to about 20% by weight of combined tertiary-aminoethyl acrylate of the kind embraced by Formula I, preferably between about 1 or 2% and about 10% by weight of such a compound, it may be necessary to start with an amount of the tertiary-aminoethyl acrylate either more or less than that which is present in the finished copolymer in order that the said copolymer will have the ultimate composition desired or required in order to impart optimum dye receptivity thereto.

Although the new copolymers of this invention are particularly useful in the formation of fibers or filaments which are more amenable to dyeing than homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of my invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

The unoriented and oriented fibers produced from my new copolymers are readily dyed, especially with an acid dye, while the fiber is in either a gel (e. g., aquagel) or a dry state.

I claim:

1. A polymerizable composition comprising (1) 2-(4-morpholinyl)ethyl acrylate and (2) acrylonitrile, the compound of (1) constituting from about 1% to about 20% by weight of the total amount of (1) and (2), and the copolymer obtained by polymerization of the said polymerizable composition being formable into fibers and being more readily dyed with an acid dye than homopolymeric acrylonitrile.

2. A composition comprising a copolymer of copolymerizable substances including 2-(4-morpholinyl)ethyl acrylate and acrylonitrile in a weight ratio of from about 1% to about 20% of the former to from about 99% to about 80% of the latter, the said copolymer being formable into fibers and being more readily dyed with an acid dye than homopolymeric acrylonitrile.

3. A copolymer of mixed monomers consisting of from 2% to 10% by weight of 2-(4-morpholinyl)ethyl acrylate and the remainder acrylonitrile, the said copolymer being formable into fibers and being more readily dyed with an acid dye than homopolymeric acrylonitrile.

4. The method of preparing a new copolymer which comprises polymerizing in an aqueous medium, with the aid of a polymerization catalyst, a mixture of comonomers including (1) 2-(4-morpholinyl)ethyl acrylate and (2) acrylonitrile, the compound of (1) constituting from about 1% to about 20% by weight of the total amount of (1) and (2), and isolating the resulting copolymer, the said copolymer being formable into fibers and being more readily dyed with an acid dye than homopolymeric acrylonitrile.

5. A composition comprising a copolymer of copolymerizable substances including 2-(4-morpholinyl)ethyl acrylate and acrylonitrile in a weight ratio of from about 5% of the former to about 95% of the latter, the said copolymer being formable into fibers and being more readily dyed with an acid dye than homopolymeric acrylonitrile.

6. The method of preparing a new copolymer which comprises polymerizing in an acidic aqueous medium, with the aid of a reduction-oxidation catalyst system, a mixture of comonomers including (1) 2-(4-morpholinyl)-ethyl acrylate and (2) acrylonitrile, the compound of (1) constituting from about 1% to about 20% by weight of the total amount of (1) and (2), and isolating the resulting copolymer, the said copolymer being formable into fibers and being more readily dyed with an acid dye than homopolymeric acrylonitrile.

7. A method as in claim 6 wherein the reduction-oxidation catalyst system comprises ammonium persulfate and sodium meta-bisulfite.

8. The method of preparing a copolymer of acrylonitrile and 2-(4-morpholinyl)ethyl acrylate which comprises forming a solution of the following ingredients in the stated proportions by weight:

| | Parts (approximately) |
|---|---|
| Acrylonitrile | 50.3 |
| 2-(4-morpholinyl)ethyl acrylate | 2.7 |
| Water | 1000.0 |
| Sulfuric acid | 0.8 | adding to the resulting solution (a) an aqueous solution of ammonium persulfate and (b) an aqueous solution of sodium meta-bisulfite, the ammonium persulfate of (a) and the sodium meta-bisulfite of (b) being employed in a weight ratio of about 1.71 parts of the former to about 0.36 part of the latter; effecting copolymerization of the said acrylonitrile and 2-(4-morpholinyl)ethyl acrylate by heating the resulting solution for 6 hours at 35° C., and isolating the copolymer thereby obtained, said copolymer being formable into fibers and being more readily dyed with an acid dye than homopolymeric acrylonitrile.

References Cited in the file of this patent

UNITED STATES PATENTS

| 2,138,763 | Graves | Nov. 29, 1938 |
| 2,628,223 | Richards | Feb. 10, 1953 |
| 2,643,990 | Ham | June 30, 1953 |